United States Patent [19]

Carter

[11] Patent Number: 4,749,250
[45] Date of Patent: Jun. 7, 1988

[54] OPTICAL ALIGNMENT HOUSING FOR USE WITH AN OPTICAL FIBER

[75] Inventor: A. C. Carter, Blisworth, England

[73] Assignee: Plessey Overseas Limited, Ilford, England

[21] Appl. No.: 862,174

[22] Filed: May 12, 1986

Related U.S. Application Data

[63] Continuation of Ser. No. 567,896, Jan. 3, 1984, abandoned.

[30] Foreign Application Priority Data

Jan. 5, 1983 [GB] United Kingdom ............... 8300139

[51] Int. Cl.⁴ .......................... G02B 6/36; H01J 5/16; H01L 23/02
[52] U.S. Cl. ............... 350/96.20; 350/96.15; 350/96.18; 250/227; 357/74
[58] Field of Search ............ 350/96.10, 96.17, 96.15, 350/96.18, 96.20, 96.21, 96.22; 250/227; 372/6, 9, 14, 20; 357/74

[56] References Cited

U.S. PATENT DOCUMENTS

| | | | |
|---|---|---|---|
| 3,705,992 | 12/1972 | Ippen et al. | 372/6 |
| 3,781,546 | 12/1973 | Christian et al. | 350/96.18 |
| 4,003,074 | 1/1977 | Yonezu et al. | 357/74 |
| 4,183,618 | 1/1980 | Rush et al. | 350/96.21 |
| 4,307,934 | 12/1981 | Palmer | 350/96.20 |
| 4,475,788 | 10/1984 | Tommassini et al. | 350/96.18 |
| 4,627,068 | 12/1986 | Johnson et al. | 372/6 X |
| 4,687,285 | 8/1987 | Hily et al. | 350/96.18 |
| 4,705,351 | 11/1987 | Toda | 350/96.18 |

FOREIGN PATENT DOCUMENTS

| | | | |
|---|---|---|---|
| 0035054 | 9/1981 | European Pat. Off. | 350/96.21 |
| 1232671 | 5/1971 | United Kingdom | 350/96.18 |
| 1429843 | 3/1976 | United Kingdom | 350/96.21 |
| 1492248 | 11/1977 | United Kingdom | 350/96.22 |
| 1537477 | 12/1978 | United Kingdom | 350/96.20 |
| 2054896 | 2/1981 | United Kingdom | 350/96.18 |

OTHER PUBLICATIONS

Kolodzey et al., "Optical Connector Measurement System", IBM Tech. Discl. Bull., vol. 22, No. 1, Jun. 1979, pp. 47-48.

*Primary Examiner*—William L. Sikes
*Assistant Examiner*—Brian M. Healy
*Attorney, Agent, or Firm*—Fleit, Jacobson, Cohn & Price

[57] ABSTRACT

A method of aligning an optical fibre with a light source, such as a solid state laser, comprises substantially aligning the axis of optical fibre with the light source and locating two lenses between the fibre and the source. One of the lenses is fixed and the other is movable in a plane perpendicular to the axis of the fibre. The lens is moved until the image of the light source is focussed on to the end of the fibre, the fibre also being axially movable. The method can be termed an "optical lever", movement of the lens causing a smaller movement of the image. The requirement for fixing the fibre or the lens extremely accurately is therefore reduced.

4 Claims, 1 Drawing Sheet

OPTICAL ALIGNMENT HOUSING FOR USE WITH AN OPTICAL FIBER

This application is a continuation of application Ser. No. 567,896, filed Jan. 3, 1984 now abandoned.

OPTICAL ALIGNMENT MEANS

BACKGROUND OF THE INVENTION

This invention relates to optical alignment means and more particularly to optical alignment means for aligning an optical fibre accurately with respect to a source of light.

The invention is particularly suitable for the alignment of a monomode optical fibre to a solid state laser as this type of alignment must be accurate to within one or two microns to avoid serious loss of light. Direct alignment methods are difficult as the fibre must be fixed within these tolerances such as by soldering or bonding. These processes can easily result in slight relative movements between the fibre and the laser during setting or curing.

It is an object of the present invention therefore to provide optical alignment means which will overcome or considerably reduce this problem.

SUMMARY OF THE INVENTION

According to the present invention optical alignment means for aligning an optical fibre with respect to a source of light comprises means for substantially aligning the source of light with the axis of the optical fibre, a plurality of optical lenses between the end of the optical fibre and the source of light, at least one of the lenses and the optical fibre being movable relative to the source of light whereby the image of the source of light can be accurately focussed on to the end of the optical fibre.

Preferably the at least one lens is only movable in a plane perpendicular to the axis of the optical fibre.

Preferably the optical fibre is only movable along its axis.

The source of light is preferably fixed.

There may be only two lenses, the lens nearer to the end of the optical fibre being movable and the other lens being fixed.

The lens and the optical fibre are preferably secured in position after accurate alignment although alternately they may be permitted a degree of movement for future realignment operations.

The source of light may comprise an opto-electronic device such as a laser.

BRIEF DESCRIPTION OF THE DRAWINGS

Embodiments of the invention will now be described by way of example only with reference to the accompanying drawings in which.

DESCRIPTION OF THE PREFERRED EMBODIMENTS

Figure 1:
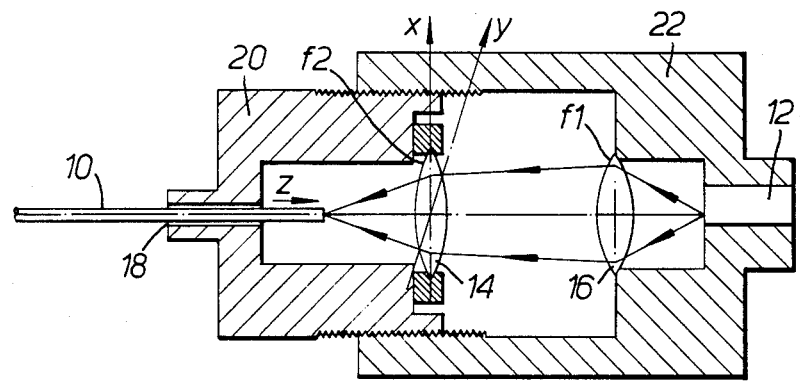
FIG. 1 is a cross-sectional view of one embodiment of means for optically aligning an optical fibre with a laser in accordance with the invention and, FIG. 2 is a cross-sectional view of an alternative embodiment.

In FIG. 1 there is shown an optical fibre 10 located in a hole 18 in a housing 20, the axis of the fibre being substantially in alignment with an injection laser diode 12 secured in a second housing 22. Two lenses 14 and 16 are interposed between the fibre 10 and the laser 12, the lens being fixed in position in the housing 22 and the lens 14 being movable in the housing 20 by suitable means (not shown) in the x, y plane perpendicular to the axis of the fibre. The fibre is movable longitudinally in direction z.

By a suitable choice of lens powers an effective reduction in alignment tolerance is achieved. Thus in FIG. 1, if f1 is the focal length of the lens 16 and f2 is the focal length of the lens 14, a movement x of the lens 14 will be given a movement of the image of the laser of x/m in the plane of the fibre end (where $m = f2/f1$).

Consequently the dimensional tolerance is reduced by the factor f2/f1 compared to moving the fibre relative to the laser alone without the lens system.

The alignment method can be described as an "optical lever", i.e. the movement of the lens 14 causes a smaller movement in the image. The fibre is positioned axially so that the image of the laser is focussed on to the end of the fibre 10 and the fibre and the lens 14 can then be permanently secured in position in the housing 20 which is preferably hermetically sealed. Alternatively, means (not shown) can be provided for moving the lens 14 and the fibre 10 externally of the container to permit future alignment.

Figure 2:
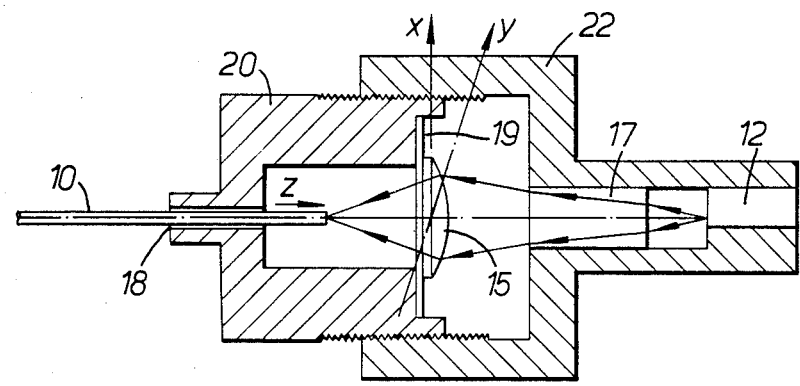

FIG. 2 illustrates a similar scheme using different lens types. The lens 16 is replaced by a cylindrical selfoc lens 17, and the lens 14 is replaced by a plano-convex lens 15. The lens 15 can move in the x, y plane along a glass plate 19 by means not shown. Again, if f1 is the focal length of the lens 17 and f2 is the focal length of the lens 15, a movement x of the lens 15 will give a movement of the image of the laser of x/m in the plane of the fibre end (where $m \sim f2/2f1$ depending on the working distance of the selfoc lens 17 from the laser 12.

The method is suitable for precision alignment of various optical systems such as optical discs, optical fibre connectors (by passing a light along one of two substantially aligned fibres) and integrated optic interconnectors.

I claim:

1. Optical aligning apparatus for aligning an optical fibre with respect to a source of light, comprising a housing defining a central axis, a first end to said housing, said first end having an opening aligned with said central axis, an optical fibre received in said opening and presenting an end thereof nominally on said central axis, a second end to said housing, said second end supporting a light source nominally on said central axis, first and second light displacement means located in said housing on said central axis between said light source and said end of said optical fibre, said first light displacement means having a first focal length and said second light displacement means having a second lesser focal length, said first light displacement means being fixed relative to said light source, said optical fibre and said central axis, adjustable mounting means supporting said second light displacement means, said adjustable mounting means permitting adjustment of said second light displacement means transversely of said central axis whereby light, emanating from said light source and displaced by said first light displacement means, may be adjustably displaced by said second light displacement means to be received by said end of said optical fibre.

2. Optical aligning apparatus according to claim 1 wherein said optical fibre is adjustably received in said opening in said first end to said housing so that said end of said optical fibre is movable nominally along said central axis.

3. Optical aligning apparatus according to claim 1 wherein said first and said second light displacement means are each constituted by a lens.

4. Optical aligning apparatus according to claim 1 wherein said housing comprises first and second sections, said first section including said light source and said first light displacement means and said second section including said second light displacement means and said received optical fibre.

* * * * *